(12) United States Patent
Lehtinen et al.

(10) Patent No.: US 9,254,584 B2
(45) Date of Patent: Feb. 9, 2016

(54) PROCESS FOR ADDING A COUPLING AGENT TO RAW STOCK

(75) Inventors: Liisa Lehtinen, Lahti (FI); Piia Peltola, Hämeenlinna (FI); Risto Laaksonen, Lahti (FI)

(73) Assignee: UPM-Kymmene Corporation, Helsinki (FI)

( * ) Notice: Subject to any disclaimer, the term of this patent is extended or adjusted under 35 U.S.C. 154(b) by 0 days.

(21) Appl. No.: 13/147,052

(22) PCT Filed: Jan. 29, 2010

(86) PCT No.: PCT/FI2010/050050
§ 371 (c)(1),
(2), (4) Date: Jul. 29, 2011

(87) PCT Pub. No.: WO2010/086506
PCT Pub. Date: Aug. 5, 2010

(65) Prior Publication Data
US 2011/0294909 A1 Dec. 1, 2011

(30) Foreign Application Priority Data

Jan. 30, 2009 (FI) ...................................... 20095081

(51) Int. Cl.
| | | |
|---|---|---|
| *B29B 17/00* | (2006.01) | |
| *B27N 1/02* | (2006.01) | |
| *C08J 5/06* | (2006.01) | |
| *B29K 711/12* | (2006.01) | |
| *B29L 7/00* | (2006.01) | |
| *B29L 9/00* | (2006.01) | |

(52) U.S. Cl.
CPC . *B29B 17/00* (2013.01); *B27N 1/02* (2013.01); *C08J 5/06* (2013.01); *B29K 2711/123* (2013.01); *B29L 2007/005* (2013.01); *B29L 2009/00* (2013.01); *Y02W 30/62* (2015.05)

(58) Field of Classification Search
CPC ............ B29B 17/00; B27N 1/02; C08J 5/06; B29L 2007/005; B29L 2009/00; B29K 2711/123; Y02W 30/62
USPC ........ 521/40, 40.5, 41, 45.5; 524/1, 9, 13, 14, 524/76; 423/1, 123, 129, 200, 210, 222; 428/364, 374
See application file for complete search history.

(56) References Cited

U.S. PATENT DOCUMENTS

| | | | |
|---|---|---|---|
| 5,552,511 A * | 9/1996 | Miller et al. ................... | 528/277 |
| 6,409,952 B1 | 6/2002 | Hacker et al. | |
| 6,971,211 B1 | 12/2005 | Zehner | |
| 7,405,248 B1 | 7/2008 | Tröger et al. | |
| 2002/0165289 A1 | 11/2002 | Park et al. | |
| 2003/0032702 A1 * | 2/2003 | Medoff et al. ................... | 524/13 |
| 2003/0228454 A1 | 12/2003 | Barlow et al. | |
| 2004/0126515 A1 | 7/2004 | Yarmoska | |
| 2007/0169901 A1 | 7/2007 | Werz | |

FOREIGN PATENT DOCUMENTS

| | | |
|---|---|---|
| CA | 2 273 961 A1 | 6/1998 |
| CH | 694 364 A5 | 12/2004 |
| DE | 41 02 178 A1 | 9/1991 |
| DE | 103 04 095 A1 | 8/2004 |
| EP | 0 667 375 B1 | 1/2002 |
| EP | 1 075 377 B1 | 10/2003 |
| EP | 2 391 490 B1 | 7/2014 |
| JP | 3085676 U | 2/2002 |
| WO | WO 99/11453 A1 | 3/1999 |
| WO | WO 02/103113 A2 | 12/2002 |
| WO | WO 2007/056839 A1 | 5/2007 |
| WO | WO 2008/046955 A1 | 4/2008 |
| WO | WO 2008/138794 | 12/2008 |

OTHER PUBLICATIONS

Machine translation of DE 10304095.*
Supplementary European Search Report for corresponding European Patent Application No. 10735514 mailed Mar. 20, 2013.
International Search Report for corresponding International Patent Application No. PCT/FI2010/050050 mailed May 5, 2010.
International Preliminary Report on Patentability for corresponding International Patent Application No. PCT/FI2010/050050 mailed Apr. 27, 2011.
Finnish Search Report for corresponding Finnish Patent Application No. 20095081 mailed Sep. 28, 2009.
Communication Pursuant to Rule 114(2) EPC by the European Patent Office for corresponding European Patent Application No. 10735514.1 mailed Jun. 24, 2014.
Notice of Opposition to a European Patent for corresponding European Patent No. 2,391,490 mailed May 22, 2015 filed by REHAU AG & Co.
Notice of Opposition to a European Patent for corresponding European Patent No. 2,391,490 mailed May 22, 2015 filed by Mr. Joseph Scmitz.
Notice of Opposition to a European Patent for corresponding European Patent No. 2,391,490 mailed May 22, 2015 filed by Stora Enso Oyj.
Communication of Notices of Opposition (R. 79(1) EPC) for corresponding European Patent No. 2,391,490 mailed May 22, 2015.

(Continued)

*Primary Examiner* — Frances Tischler
(74) *Attorney, Agent, or Firm* — Merchant & Gould P.C.

(57) ABSTRACT

The invention relates to a process for manufacturing composite material which contains fiber based and polymer based material, wherein the manufacture includes a preliminary treatment process to form a raw stock mixture. According to the invention, the preliminary treatment process includes a hot-cold mixing device which comprises at least a heating stage, and that raw stock, which contains lignin-free material, and a coupling agent are fed to the mixing device to form the raw stock mixture, and adhesion between fiber based and polymer based substances of the raw stock is ameliorated by the coupling agent.

10 Claims, No Drawings

(56) References Cited

OTHER PUBLICATIONS

Communication of a Notice of Opposition for corresponding European Patent No. 2,391,490 mailed Apr. 23, 2015.
Espert, A. et al., "Thermal and Thermomechanical Properties of Biocomposites Made from Modified Recycled Cellulose and Recycled Polypropylene", *Journal of Applied Polymer Science*, 89: 2353-2360, (2003).
Li, H. et al., "High Stiffness Natural Fiber-Reinforced Hybrid Polypropylene Composites", *Polymer-Plastics Technology and Engineering*, 42(5): 853-862, (2003).
Radovanovic, I., "Verarbeitung und Optimierung der Rezeptur von Wood Plastic Composites (WPC)", Dissertation, 124 pps, (2007).

* cited by examiner

PROCESS FOR ADDING A COUPLING AGENT TO RAW STOCK

This application is a National Stage Application of PCT/FI2010/050050, filed 29 Jan. 2010, which claims benefit of Serial No. 20095081, filed 30 Jan. 2009 in Finland and which applications are incorporated herein by reference. To the extent appropriate, a claim of priority is made to each of the above disclosed applications.

FIELD OF THE INVENTION

The invention relates to a process as defined in the preamble of 1 for adding a coupling agent to raw stock in the manufacture of composite material.

BACKGROUND OF THE INVENTION

Known from the prior art are different processes and apparatuses for manufacturing composite materials from mainly solid raw stock. The raw stock and optional additives may be conducted directly to an extrusion process or to an extrusion process via a preliminary treatment process, e.g. granulation or a mixing process, to manufacture the composite material.

Furthermore, it is known from the prior art, e.g. from reference US 2004/0126515, to add a coupling agent to raw stock in the manufacture of composite material, especially wood composite material, at the extrusion stage. It is known to use maleic anhydride modified polyolefins, e.g. MAPE and MAPP, as the coupling agent in the manufacture of wood composites. MAPE or MAPP reacts with wood fibers, forming a covalent bond between the carbonyl group of the anhydride and the hydroxyl group of the fiber. The polyolefin moiety of the coupling agent binds mechanically to the polymeric matrix of the raw stock. Also silane based coupling agents are used. A high process temperature, mainly of above 180° C., is needed at the stage where the coupling agent is added, so that sufficient adhesion is acquired between the coupling agent and raw stock. Providing a sufficiently high process temperature without a separate heating stage is often problematic. Another problem has been to provide sufficiently good adhesion between lignin-free fiber and plastic. Before, a sufficiently strong bond has not been provided between lignin-free fiber and plastic in the presence of a coupling agent. In this case, the mechanical properties of the composite material to be formed have been poor.

OBJECTIVE OF THE INVENTION

The objective of the invention is to disclose a new process for manufacturing composite material. Furthermore, the objective of the invention is to disclose adding of a coupling agent to raw stock already at a preliminary treatment stage. In addition, the objective of the invention is to disclose a process in which adhesion between the coupling agent and raw stock and between different substances of the raw stock can be ameliorated.

SUMMARY OF THE INVENTION

The process according to the invention is characterized by what has been presented in the claims.

The invention is based on a process for manufacturing composite material which contains fiber based and polymer based material, wherein the manufacture includes a preliminary treatment process to form a raw stock mixture for manufacturing the composite material. According to the invention, the preliminary treatment process includes a hot-cold mixing device comprising at least a heating stage. According to the invention, raw stock that contains lignin-free material and a coupling agent are fed to the hot-cold mixing device to form the raw stock mixture, and adhesion between fiber based and polymer based substances of the raw stock is ameliorated by the coupling agent.

In this context, by a raw stock mixture is meant a mixture which may contain one or more raw stocks and/or one or more raw stock materials, e.g. recycling material. Furthermore, the raw stock mixture contains a coupling agent to be added in a preliminary treatment process. In addition, the raw stock mixture may contain additives and/or additional plastic. By raw stock is meant at least one raw stock or a mixture of a number of different raw stocks. The raw stock may be any raw stock or raw stock material which contains lignin-free fiber based, e.g. wood fiber, straw, reed or flax based or other plant fiber based, and/or polymer based, such as plastic based, components. In one embodiment, wood fiber based lignin-free material may encompass paper-based material manufactured from the above-mentioned plants.

The fiber based material of the raw stock contains lignin-free material, e.g. chemical pulp based paper or paper fiber or pure chemical pulp fiber which does not contain lignin.

In this context, by a coupling agent is meant any adhesive or material that ameliorates adhesion between different substances.

In one embodiment of the invention, organic material which contains maleic anhydrides is used as the coupling agent. In one embodiment, the coupling agent is selected from the group of MAPE (maleic anhydride polyethylene), MAPP (maleic anhydride polypropylene) and their mixtures. In one embodiment, the coupling agent is silane based. Alternatively, any coupling agent known per se and suitable for the purpose may be used.

In one preferred embodiment, a substantially homogenous raw stock mixture is formed in the mixing device. Preferably, raw stocks and the coupling agent as well as the optional additives and additional plastic are mixed in the mixing device to a homogeneous raw stock mixture.

In one embodiment of the invention, agglomerates are formed from the raw stock mixture in the mixing device.

In one embodiment of the invention, the raw stock mixture is heated in the mixing device to a temperature of above 180° C., in which case raw stock and the coupling agent react to provide adhesion between fiber and polymer based substances of the raw stock by means of the coupling agent. In one embodiment, the raw stock mixture is heated in the mixing device to a temperature of above 185° C., in which case raw stock and the coupling agent react to provide adhesion between fiber and polymer based substances of the raw stock by means of the coupling agent. Providing a sufficiently high temperature to the reaction between raw stock and the coupling agent may be secured by sufficiently long dwell time. Especially the construction of a hot-cold type mixing device guarantees a sufficiently long dwell time, e.g. of 15 to 20 min, to provide the reaction between raw stock and the coupling agent.

In one embodiment of the invention, a mixing device which includes heating and cooling stages is used. It is not obligatory to use the cooling stage in all running applications, i.e. the mixing device may be used without the cooling stage even if it would include a cooling section. In one preferred embodiment, the cooling stage follows the heating stage.

In one embodiment, a substantially powerful mixing is provided in the heating stage. Thanks to the mixing, large contact area is provided between raw stock and the coupling agent. Mixing also contributes to evaporation of water, which weakens the coupling, and to its departure from the process. In one embodiment, mixing is provided also in the cooling stage.

In one preferred embodiment, the heating part is arranged so as to provide relatively long dwell time for the raw stock flow. In one embodiment, the mixing device is a hot-cold mixer with high mixing rates, long dwell time and in which agglomerates are formed. High temperatures are reached with a hot-cold mixer.

In one preferred mixing device, the material mixture is heated, normally to a temperature of approximately 200° C., in which case plastic and/or additional plastic contained by raw stocks is fused at least partly so as to form agglomerates. After heating, the mixture is cooled, e.g. by a water jacket, in a cooling section, preferably to a temperature of approximately 70° C.

In one embodiment of the invention, mainly solid raw stock is fed to the mixing device to form the raw stock mixture.

In one embodiment of the invention, recycling material which contains wood fiber based and/or polymer based material is used as at least one raw stock.

In one embodiment of the invention, adhesive laminate waste is fed to the mixing process as at least one raw stock. In one preferred embodiment, the raw stock consists mainly of adhesive laminate waste. In one embodiment, the raw stock contains at least one adhesive laminate waste component. In one embodiment, the raw stock contains more than one adhesive laminate waste component.

In one embodiment, the adhesive laminate waste contains adhesive material onto which a layer of glue has been provided, and fitted onto the layer of glue as a protective sheet is release material that can be easily released at the application site of the sticker. In one preferred embodiment, the adhesive material and/or release material contains a wood fiber based component and/or a plastic or polymer based or other organic component. Also, the use of different inorganic materials is possible. In one embodiment, the adhesive and/or release material encompasses wood fiber based paper, paperboard or the like. In one embodiment, the wood fiber based paper, paperboard or the like contains or is treated with plastic or polymer based material. In one embodiment, the adhesive and/or release material may be formed from substantially plastic or polymer based material. In one embodiment, the release material is formed mainly from plastic based material, containing e.g. polypropylene, polyethylene, polyethylene terephthalate or their mixtures. In one embodiment, the release material contains a silicone based component, such as siliconized material, e.g. siliconized film material. In one embodiment, the release material is coated with silicone based material or compound.

In one embodiment, finished adhesive laminate products, waste material produced by them and/or in their manufacture may be used in the manufacture of the composite material. In addition, waste material from production and recycling material from the upgrading stage or end use applications of adhesive laminate products may be used. In one embodiment, the adhesive laminate waste comes from adhesive laminate production which produces mainly production reject waste, edge trimming waste cut off from rolls, and roll ends; from the adhesive laminate printing plant which produces mainly roll ends and adhesive material left over from die-cutting of stickers and labels, as well as reject waste; and/or from the adhesive laminate end user customer who pastes the printed stickers and labels or the like on products. The waste coming from the end user encompasses mainly release material, roll ends and waste from the finished product.

In one embodiment, the adhesive laminate waste may contain a variable amount of different adhesive laminate waste components, such as adhesive material, glue and release material. The glue may be preferably provided in the adhesive material and/or release material. Normally, the adhesive material and/or release material contains lignin-free material.

In one embodiment, special recycling paper which is not accepted within normal recycling paper and which may also contain glue, such as different catalogues, phone books or the like, may be used as at least one raw stock.

In one embodiment of the invention, the raw stock is crushed to a predetermined particle size before conducting it to the mixing device. The raw stock is e.g. chopped to a desired particle size. In one embodiment, the particle size of the raw stock preferably ranges between 1 and 10 mm.

In one embodiment of the invention, at least one additive is fed to the mixing device. In one embodiment, additional plastic is fed to the mixing device. The additives and/or additional plastic may be fed each as separate or all as combined feed to the mixing device, or they may be combined with some other raw stock feed before the mixing device.

In one preferred embodiment, at least part of the additives, additional material and/or additional plastic used for the composite material is fed in a preliminary treatment process, such as a mixing process, to the raw stock mixture. In one embodiment, among the additives, e.g. lubricant, fire retardant and adhesion promoter may be fed to the mixing device.

Virgin or recycling plastic may be used as additional plastic. The composite material may be manufactured with or without additional plastic. In one embodiment, adhesive laminate waste added with e.g. polyolefin, polypropylene, polyethylene (HDPE, LDPE) or other suitable plastic or their mixture as additional plastic is used as raw stock to manufacture the wood composite material.

In one embodiment, a material selected from the group of fibrous materials, organic fillers, inorganic fillers, powdery reinforcements, powdery additives, talc, wood fibers, chemical pulp fibers, paper and their combinations is fed to the mixing process as the additive.

The process according to the invention provides considerable advantages as compared with the prior art.

A sufficiently high temperature, long dwell time and large contact area is provided in the preliminary treatment device, especially in a hot-cold mixing device containing a heating stage, for the reaction between raw stock and the coupling agent, in which case excellent adhesion between polymer based and fiber based substances of the raw stock is provided. In addition, water, if present, is removed efficiently in the hot-cold mixing device, which ameliorates adhesion, because water disturbs functioning of the coupling agent. Thanks to the invention, good adhesion is acquired also between lignin-free wood fiber, coupling agent and polymer.

Thanks to the invention, a homogeneous composite product is provided, as well as high mechanical properties for the product, owing to the ameliorated adhesion.

In the process according to the invention, the particle size of chopped raw stock to be conducted to the mixing device may be raised, because crushing of the particles takes place at the mixing device owing to the mixing.

An industrially applicable easy, quick and useful manner of adding a coupling agent to composite material raw stock already at the preliminary treatment stage, preferably at the agglomerate manufacturing stage, is achieved by the invention, in which case the composite material manufacturing equipment can be simplified, e.g. for the part of the granulation device or additional extruder.

DETAILED DESCRIPTION OF THE INVENTION

In the following section, the invention will be described with reference to detailed examples of its embodiments.

Example 1

In these tests, different processes for adding a coupling agent to composite material raw stock were compared.

Adhesive laminate waste which contained chemical pulp based paper fiber and plastic was used as raw stock. The paper fiber contained lignin-free material.

Different preliminary treatment processes for adding a coupling agent to composite material raw stock, such as a hot cold mixing process, preliminary granulation process and regrinding process, were compared in the tests. Results acquired from preliminary treatment processes were compared with results acquired from a composite material extrusion manufacturing process when the coupling agent was added directly to raw stock in the extrusion of the composite material.

In the tests it was observed that successful bonds were provided in the hot-cold mixing process between raw stock and the coupling agent, and excellent adhesion was provided between paper fiber and plastic in the raw stock. In this case, good mechanical properties were acquired for the composite material. For example, in using the hot-cold process, good material strength was provided for the composite material, in one test even material strength which was 55% better than by using direct extrusion.

Example 2

In this test, a composite material intermediate product, i.e. agglomerates, was manufactured in a hot-cold mixing device which included heating and cooling sections and mixing means. Chopped adhesive laminate waste which contained both chemical pulp based paper fiber and plastic based material was fed to the mixing device as raw stock. The raw stock was preprocessed in the mixing device to form the intermediate product. It was also possible to feed additional plastic and additives to raw stock in the mixing device. In addition, a coupling agent was mixed with raw stock in the heating section of the mixing device. MAPP was used as the coupling agent. The raw stock and the coupling agent were mixed into a raw stock mixture under efficient stirring and heated to a temperature of above 185° C.

The agglomerates formed in the mixing device could be stored, sold and/or conducted to extruder or to die-casting to manufacture the composite material.

In the tests it was observed that large contact area between raw stock and the coupling agent was provided, thanks to efficient mixing, in which case the coupling agent was made to adhere well to raw stock. In the tests it was observed that successful bonds between raw stock and the coupling agent and excellent adhesion between chemical pulp fibers and plastic of the raw stock was achieved, thanks to mixing, sufficiently high temperature and long dwell time.

Based on the tests it was observed that the process according to the invention suits especially well to provide a reaction between raw stock and a coupling agent and to increase adhesion between different components of raw stocks. Based on the tests it was observed that mechanical properties of the composite material could be ameliorated, in one case even for 30 to 40%, by the process according to the invention in which agglomerates are formed and in which the coupling agent is added to raw stock already before formation of the agglomerates, as compared with the before used preliminary granulation and extruder technique.

The process according to the invention suits in different embodiments for use in connection with the manufacture of most different composite materials.

The invention is not limited merely to the examples referred to above; instead, many variations are possible within the scope of the inventive idea defined by the claims.

The invention claimed is:

1. A process for manufacturing composite material which contains a wood fiber based lignin-free material and a polymer based material, wherein the process for manufacturing includes a preliminary treatment process to form agglomerates from a raw stock mixture, wherein the preliminary treatment process includes a hot-cold mixing device which comprises at least a heating stage and a cooling stage, the hot-cold mixing device provides a temperature of above 180° C., a dwell time of at least 15 minutes, a contact area and a mixing rate that provides reaction between a raw stock and a coupling agent, wherein the preliminary treatment process comprises feeding the coupling agent, the raw stock containing the wood fiber based lignin-free material, and the polymer based material to the hot-cold mixing device to form the raw stock mixture, heating the raw stock mixture in the heating stage of the hot-cold mixing device to the temperature of above 180° C. for a dwell time of at least 15 minutes wherein adhesion between the fiber based lignin-free material and the polymer based material of the raw stock is ameliorated by the coupling agent, the temperature, the dwell time, the mixing rate and the contact area, cooling and mixing the raw stock mixture in the cooling stage of the hot-cold mixing device, and forming the agglomerates from the raw stock mixture in the hot-cold mixing device.

2. The process according to claim 1, further comprising forming the raw stock mixture in the mixing device to a temperature of above 185° C.

3. The process according to claim 1, wherein the raw stock comprises recycling material which contains the wood fiber based lignin-free material and/or the polymer based material.

4. The process according to claim 1, wherein the raw stock comprises adhesive laminate waste.

5. The process according to claim 1, further comprising crushing the raw stock to a predetermined particle size before conducting it to the mixing device.

6. The process according to claim 1, further comprising feeding additional plastic to the mixing device.

7. The process according to claim 1, further comprising feeding additive to the mixing device.

8. The process according to claim 1, wherein the coupling agent comprises organic material which contains maleic anhydrides.

9. The process according to claim 1, wherein the coupling agent is selected from the group of MAPE, MAPP and mixtures thereof.

10. The process according to claim 5, wherein the particle size of the raw stock is between 1 and 10 mm.

* * * * *